UNITED STATES PATENT OFFICE.

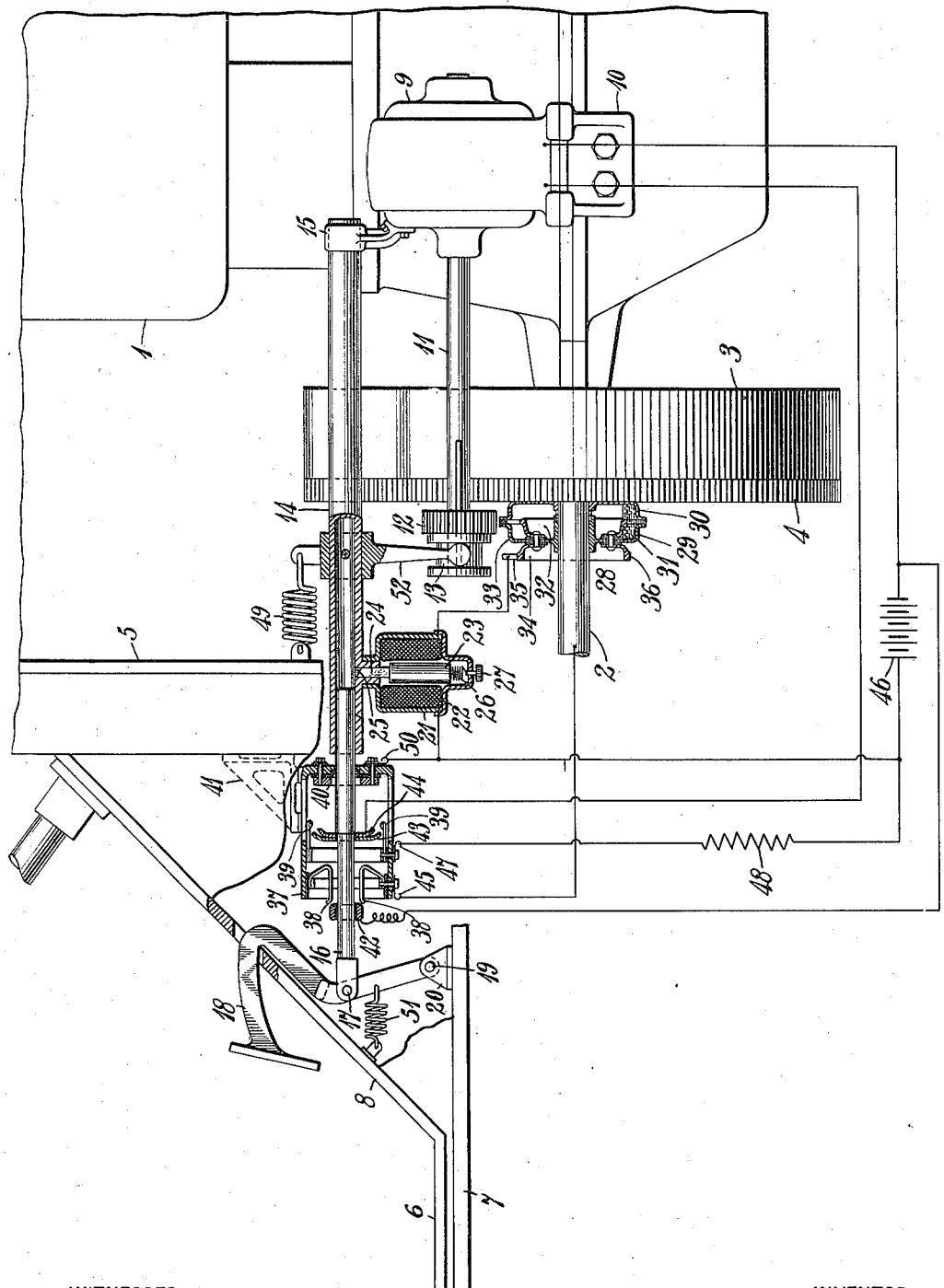

FREDERICK H. MILLER, OF WILKINSBURG, PENNSYLVANIA, ASSIGNOR TO WESTINGHOUSE ELECTRIC AND MANUFACTURING COMPANY, A CORPORATION OF PENNSYLVANIA.

STARTING DEVICE FOR AUTOMOBILES.

1,283,417.  Specification of Letters Patent.  Patented Oct. 29, 1918.

Application filed February 7, 1913. Serial No. 746,818.

*To all whom it may concern:*

Be it known that I, FREDERICK H. MILLER, a citizen of the United States, and a resident of Wilkinsburg, in the county of Allegheny and State of Pennsylvania, have invented a new and useful Improvement in Starting Devices for Automobiles, of which the following is a specification.

My invention relates to starting devices for automobiles and it has particular reference to an electrically controlled interlock for starting motors.

My invention has for one of its objects to provide a mechanism for protecting the gears of a starting motor by preventing the connection of the motor to the engine shaft of an automobile, or motor vehicle, when the engine shaft is rotating above a predetermined speed.

My invention has for a further object to provide a mechanism which automatically disconnects the starting motor from the engine shaft after the engine has reached a predetermined speed.

In the use of starting motors for gas engines, it is customary in practice to connect the motor to the flywheel of the engine by means of reduction gear mechanism, the connection being made and broken by the operator before and after starting, respectively. If the gears should be placed in mesh while the engine is running and the flywheel is rotating at a high speed, the gears will probably be damaged as a result. It is essential, therefore that a safety device be used in connection with a mechanism of this character to prevent the accidental or inadvertent meshing of the gears when the engine is in operation.

In accordance with my invention, I propose to employ an electrically controlled mechanism for rendering the starting pedal or starting shaft ineffective to mesh the connecting gears when the engine is operating under its own power.

Owing to the relatively high speed ratio usually employed between the starting motor and the engine shaft, it is essential that the motor be disconnected before the engine reaches its running speed, as the speed of the motor may become excessive when driven by the engine. This result is accomplished by the same electrically controlled mechanism above referred to, which automatically breaks the connection between the starting pedal and gear connections at a predetermined speed.

My invention is described in detail in connection with the accompanying drawings, in which the single figure is a view partially in elevation and partially in section, of a portion of an automobile with my invention attached thereto, the electrical connections being shown diagrammatically.

The automobile is provided with the usual gas engine, a portion of which is shown at 1, an engine shaft 2, upon which is mounted the flywheel 3 having a gear 4. The dashboard of the vehicle is indicated at 5, the floor at 6, and a frame member and foot board by 7 and 8, respectively. A starting motor 9, which is here shown as a dynamo electric machine, is attached to the crank case of the engine by a bracket 10 and is provided with a shaft 11 upon which is slidably keyed a pinion 12 having an integral grooved collar 13. The pinion 12 is actuated to slide on the shaft 11 by a yoke member 52 which engages the collar 13 and which is fixed to a hollow shaft 14. The shaft 14 is slidably mounted in a bracket 15 and is adapted to be reciprocated by a rod 16 that is slidably mounted in the hollow shaft 14 and is pivotally connected at 17 to a foot pedal 18 having a pivotal support at 19 in a lug 20 on the automobile frame 7 and extending through a suitable opening in the foot board 8. Rigidly connected to the hollow shaft 14, is an electro-magnet 21 having a winding 22 and a movable core 23 which is adapted, when the winding is energized, to project a locking pin 24 through an opening 25 in the hollow shaft 14 into the path of the rod 16. A spring 26, attached to an adjustable thumb screw 27, normally holds the core 23 in its retracted position.

In circuit with the magnet winding and mounted on the engine shaft, is a centrifugal switch 28 comprising a hollow casing composed of two cup shaped members 29 and 30 which inclose a quantity of mercury indicated at 31. A cup shaped member 32 has an annular periphery 33 which dips into the mercury when the switch is stationary or rotating at less than a predetermined speed, and is connected to a second cup shaped member or slip ring 34, both members 32 and 34 being insulated from the hollow casing. A brush 35 presses upon the annular surface 36 of the slip ring 34 to form one terminal of the switch. The other side of the switch is grounded through the shaft. When the engine operates under its own power, the speed is sufficient to cause the mercury to extend around the inner periphery of the casing and out of contact with the member 32. The speed at which the connection is broken may be fixed at any desired limit by adjusting the quantity of mercury or by changing the relative size of the parts.

A starting switch 37, comprising stationary contact members 38, 39 and 40, is mounted upon a bracket 41 that is attached to the dash-board 5. The movable contact members 42, 43 and 44 of the switch are mounted upon the rod 16. The contact members 38 and 42 control the circuit of the centrifugal switch and the magnet, while the members 39 and 43, 40 and 44, respectively, control circuits for operating the motor. In operating the starting switch, as by pressing the starting pedal, the members 38 and 42 first make contact to close the magnet circuit and, owing to the length of contact clips 38, this contact is mounted through the reciprocation of the rod 16 to mesh the gears. As the rod 16 is reciprocated further, the member 43 engages the members 39 to close the circuit through the motor, but this circuit is broken by the continued movement of the rod 16 and a second circuit through the motor is then completed by the contact members 44 and 40.

The operation of the starting mechanism is as follows: When the operator desires to start the engine, the pedal 18 is pressed forward to effect engagement of the contact members 38 and 42 for closing an electrical circuit, from a terminal 45 connected to the contact clips 42, to the engine shaft, through the casing members 29 and 30, mercury 31, contact member 32, slip ring 34, brush 35, magnet winding 22, battery 46 and contact member 42. The effect of closing the above circuit is to energize the magnet winding 22 which then projects the locking pin 24 into the hollow shaft 14 in position to be engaged by the rod 16.

As the rod 16 is pressed further, the contact members 39 and 43 are engaged and a circuit is closed from a terminal 47 connected to the contact members 39, through a resistor 48, battery 46, motor 9, to contact member 43. On account of the comparatively high resistance of the circuit, the motor is caused to rotate slowly. By reason of the engagement of the rod 16 with the projection 24, the hollow shaft 14 is actuated forwardly against the tension of a spring 49 to mesh the pinion 12 with the flywheel gear 4. Before the pinion 12 engages the gear 4, the contact member 43 has broken the motor circuit and the motor is rotating only by inertia. The slow rotation of the motor pinion 12 insures perfect meshing of the gear teeth while the teeth do not bind during this action, since there is no torque applied to the motor. When the pinion reaches its operative position, the contact member 44 has completed the running circuit of the motor, which is through the contact member 40, terminal 50, battery 46, and motor 9 back to the contact member 44.

The motor now rotates the engine shaft to start the engine. When the latter operates under its own power, the speed is sufficient to break the contact between the mercury and the contact member 32 of the centrifugal switch 28, thus breaking the magnet circuit. The magnet winding is deënergized and the spring 26 retracts the core 23 and withdraws the locking pin 24 out of engagement with the rod 16. The spring 49 at once retracts the hollow shaft 14 and disengages the pinion 12 from the flywheel 4. This action takes place regardless of the release of the starting pedal by the operator, the rod 16 being telescoped by the hollow shaft 14. The pedal 18 will be returned to its normal position by a spring 51 upon the removal of the pressure of the operator's foot. The motor pinion 12 cannot be engaged with the flywheel gear when the engine is running because the magnet circuit is broken by the centrifugal switch and the rod 16 is ineffective to operate the hollow shaft 14 unless the locking pin 24 is in a position to be engaged by the rod. Since the minimum speed of the gas engine is high, relative to the speed necessary for starting, the centrifugal switch may be adjusted to break the circuit below the minimum speed of the engine and above the starting speed, thus insuring that the pinion will be disconnected from the flywheel before the engine reaches its running speed and that the meshing of the gears cannot take place when the engine is operating under its own power.

It will be understood that such changes and modifications may be made as will fall within the scope of the appended claims.

I claim as my invention:

1. In a starting device, the combination with an engine shaft, a starting motor and gear mechanism for operatively connecting said motor to said shaft, of means for operatively connecting said gear mechanism comprising two relatively movable members, and a centrifugal speed-controlled device for controlling the operative connection of said members.

2. In combination, a starting motor, a pinion operatively connected to said motor and movable relatively thereto, means for moving said pinion comprising two members, movable longitudinally one within the other and responsive means for connecting said members.

3. In combination, a starting motor, a pinion movably mounted and operatively connected to said motor, means for moving said pinion comprising a hollow shaft, a rod adapted to slide in said hollow shaft, and electro-responsive means for connecting said members.

4. In a starting mechanism, the combination with an engine shaft, a starting motor and a pinion adapted to operatively connect said motor to said engine shaft, of a member movable at all times, means for connecting said member to said pinion and centrifugal speed-responsive means rendering said connecting means operative only when said shaft rotates at less than a predetermined speed.

5. In a starting mechanism, the combination with an engine shaft, a starting motor, and a pinion operatively connected thereto, of a movable member, a member connected to said pinion and a speed-responsive centrifugal means rendering the last named member engageable by said movable member only when said engine shaft rotates at less than a predetermined speed.

6. In a starting device, the combination with an engine shaft, a starting motor, and gear mechanism for connecting said motor to said engine shaft, of means for meshing said gears comprising two relatively movable members adapted to be operatively connected, and means comprising a centrifugal device for preventing the connection of said members when said engine shaft rotates above a predetermined speed.

7. The combination with an engine, of a starting motor, a pinion operatively connected to said motor and movable relative thereto, of means for moving said pinion comprising two members movable, one within the other and adapted to be operatively connected, and means whereby the connection of said members is prevented when the engine operates under its own power.

8. In a starting mechanism, the combination with an engine shaft, a starting motor and gear mechanism for operatively connecting the said motor to said shaft, of means for connecting said gear mechanism comprising two members slidable longitudinally one within the other and adapted to be operatively connected, and means for disconnecting said members when said engine operates under its own power.

9. In a starting device, the combination with an engine shaft, a starting motor, and gear mechanism for connecting said motor to said shaft, of means for effecting the meshing of a pair of coacting gear wheels of said mechanism, said means comprising two relatively movable members, a movable element for connecting said members, and means comprising a centrifugal device for disconnecting said members at a predetermined speed of said engine shaft.

10. The combination with an engine and its shaft, of a starting motor and its shaft, relatively movable gears between said shafts, two relatively movable members for actuating one of said gears, means for operatively connecting said members, and centrifugal speed-controlled means for controlling the operation of said connecting means.

11. The combination with a starting motor, of a pinion operatively connected to said motor and movable relatively thereto, means for moving said pinion comprising a hollow member, a member within said hollow member, one of said members being connected to said pinion, and means adapted to operatively connect said members, and means for moving said members relatively to each other.

12. In a starting mechanism, the combination with an engine shaft, a starting motor, and gear mechanism for connecting the said motor to said shaft, of means for connecting said mechanism comprising two relatively movable members, a locking pin for connecting said members, an electro-magnet for controlling said pin, and a centrifugal switch adapted to deënergize said electro-magnet at a predetermined speed of said engine shaft.

13. The combination with a starting motor, of a pinion, two relatively slidable members, one of said members being hollow and connected to said pinion, means for operatively connecting said members, and means for moving said members relatively to each other.

14. The combination with a starting motor, of a pinion operatively connected to said motor and movable relatively thereto, and means for moving said pinion comprising a manually operable lever and an electro-magnet having a core controlling the movement of said lever.

15. The combination with an engine and its shaft, of a starting motor and its shaft, gear mechanism for operatively connecting said shafts and means for operating the gear mechanism comprising a foot pedal, a member connected to the foot pedal, and an electromagnet having a core adapted to project into the path of said member.

In testimony whereof I have hereunto subscribed my name this 4th day of February, 1913.

FREDERICK H. MILLER.

Witnesses:
 LEILA E. CUNNINGHAM,
 B. B. HINES.